(12) United States Patent
Kawano et al.

(10) Patent No.: US 7,326,936 B2
(45) Date of Patent: Feb. 5, 2008

(54) PHOTODETECTOR AND PHOTODETECTING DEVICE

(75) Inventors: Katsuya Kawano, Kanagawa (JP); Akihiro Kawahara, Tokyo (JP)

(73) Assignees: NEC Electronics Corporation, Kanagawa (JP); NEC Corporation, Tokyo (JP)

( * ) Notice: Subject to any disclaimer, the term of this patent is extended or adjusted under 35 U.S.C. 154(b) by 135 days.

(21) Appl. No.: 11/143,637

(22) Filed: Jun. 3, 2005

(65) Prior Publication Data

US 2005/0274896 A1  Dec. 15, 2005

(30) Foreign Application Priority Data

Jun. 14, 2004  (JP) .............................. 2004-175732

(51) Int. Cl.
*G01T 1/24* (2006.01)
(52) U.S. Cl. .............................. 250/370.14; 250/338.2; 250/338.3; 250/338.4; 250/370.45
(58) Field of Classification Search ............. 250/338.2, 250/338.3, 338.4, 370.15, 370.14
See application file for complete search history.

(56) References Cited

U.S. PATENT DOCUMENTS

| 6,320,189 | B1* | 11/2001 | Ouvrier-Buffet et al. | 250/338.4 |
| 6,441,374 | B1* | 8/2002 | Kawano et al. | 250/338.1 |
| 6,890,834 | B2* | 5/2005 | Komobuchi et al. | 438/455 |
| 6,965,107 | B2* | 11/2005 | Komobuchi et al. | 250/338.1 |
| 2001/0010360 | A1* | 8/2001 | Oda | 250/338.1 |
| 2002/0033453 | A1* | 3/2002 | Sauer et al. | 250/338.1 |
| 2003/0042421 | A1* | 3/2003 | Oda | 250/352 |

FOREIGN PATENT DOCUMENTS

JP   08-201177   8/1996

* cited by examiner

*Primary Examiner*—Constantine Hannaher
*Assistant Examiner*—Djura Malevic
(74) *Attorney, Agent, or Firm*—Young & Thompson

(57) ABSTRACT

An infrared detector includes a silicon substrate, an infrared reflecting film, a diaphragm including a bolometer thin film, disposed above the silicon substrate across a gap, and a signal line that electrically connects the bolometer thin film and the infrared reflecting film, such that the bolometer thin film and the infrared reflecting film constantly become equipotential with each other. In place of the signal line, a conductor independently provided from interconnects in the silicon substrate may be employed.

20 Claims, 5 Drawing Sheets

PHOTODETECTOR AND PHOTODETECTING DEVICE

This application is based on Japanese patent application No. 2004-175732, the content of which is incorporated hereinto by reference.

BACKGROUND OF THE INVENTION

1. Field of the Invention

The present invention relates to a photodetector and a photodetecting device.

2. Related Art

Recently, infrared detectors have come to be more widely employed, because of the capability of contactlessly measuring a temperature of an object. This has naturally generated a growing demand for an inexpensive, yet high-performance infrared detector. An example of existing infrared detectors can be found in JP-A No. 1996-201,177 (H08-201,177).

FIG. 6A is a perspective view, and FIG. 6B is a cross-sectional view showing an infrared detector 600 disclosed in JP-A 1996-201,177.

The infrared detector 600 shown in FIG. 6 includes a scanning circuit 602 provided on a semiconductor substrate 601, and an infrared reflecting layer 603 formed in an oxide layer 604 provided on the scanning circuit 602. The infrared detector 600 includes a beam 606 opposing the infrared reflecting layer 603 across a space, and the beam 606 includes an infrared absorbing layer 608, so that a signal changes a separation between the beam 606 and the infrared reflecting layer 603, to thereby change an absorbing wavelength range of an incident infrared light 607. To be more detailed, the separation is changed by applying different voltages 609 between a first conductive layer located on the side of the infrared reflecting layer 603 and a second conductive layer located on the side of the beam 606, depending on the wavelength of the infrared light to be absorbed. In addition, in such driving process, the voltage applied between the first conductive layer and the second conductive layer is changed such that a surface of the beam and a surface of the structure temporarily contact each other.

SUMMARY OF THE INVENTION

However, it has now been discovered that the foregoing technique has the following drawback.

Firstly, like the infrared detector disclosed in JP-A 1996-201,177, in the detector that has an optical area 611 in the beam (diaphragm) 606 supported by a thin leg portion 610, when a pulse bias is applied to the infrared absorbing layer 608 for reading out a signal, a potential difference is generated between the semiconductor substrate 601 and the infrared absorbing layer 608, and hence an electrostatic attraction therebetween fluctuates, to thereby cause the beam 606 to vibrate. This in turn leads to a fluctuation in parasitic capacitance of the infrared absorbing layer 608, thus resulting in generation of a noise. Therefore, there is a room for further improvement to detect an infrared light stably.

Secondly, like the infrared detector disclosed in JP-A 1996-201,177, in the detector that has an optical area 611 in the beam (diaphragm) 606 supported by the thin leg portion 610, even a small external force can readily change the height d of the space 605. It should be admitted that such a structure is advantageous in detecting an infrared light having a variable wavelength. However, since the thin leg portion 610 does not have a sufficient strength (tension), the beam 606 often generates vibration of a large amplitude, and hence requires a long time for convergence of the vibration. Consequently a considerably big noise is often generated, so there is a room for further improvement to detect an infrared light stably.

Thirdly, in the infrared detector disclosed in 1996-201,177, to adjust the height d of the space 605 between the first conductive layer located on the side of the infrared reflecting layer 603 and the second conductive layer located on the side of the beam 606, the voltage 609 is applied therebetween. Accordingly, when the applied voltage 609 fluctuates because of an affect of a noise to the voltage source, the beam 606 is caused to vibrate, thereby generating a noise. In such an aspect, there is a room for further improvement to detect an infrared light stably.

According to the present invention, there is provided a photodetector comprising a substrate; a first conductor located close to an upper face of the substrate; an optical area including a thermoelectric film, disposed above the substrate across a space; and a second conductor that electrically connects the thermoelectric film and the first conductor, such that the thermoelectric film and the first conductor have equipotential with each other.

In the photodetector thus constructed, since the second conductor is provided, the thermoelectric film in the optical area and the first conductor located close to an upper face of the substrate have equipotential with each other. Therefore, this restrains vibration due to an electrostatic attraction generated between the substrate and the optical area, thus suppressing generation of a noise. Consequently, a photodetector that can stably detect a light can be obtained.

According to the present invention, there is provided a photodetector comprising a substrate; a first conductor located close to an upper face of the substrate; an optical area including a thermoelectric film, disposed above the substrate across a space; a conductor under optical area located close to a lower face of the optical area; and a second conductor that electrically connects the conductor under optical area and the first conductor, such that the conductor under optical area and the first conductor have equipotential with each other.

In the photodetector thus constructed, since the second conductor is provided, the conductor under optical area close to a lower face of the optical area and the first conductor located close to an upper face of the substrate have equipotential with each other. Therefore, this restrains vibration due to an electrostatic attraction generated between the substrate and the optical area, thus suppressing generation of a noise. Consequently, a photodetector that can stably detect a light can be obtained.

According to the present invention, there is provided a photodetecting device comprising a plurality of the photodetectors; a scanning circuit for the photodetectors; a readout circuit for the photodetectors; a plurality of scanning lines connected to the scanning circuit; and a plurality of signal lines connected to the readout circuit.

In the device thus constructed, since a plurality of photodetectors according to the present invention is employed, a light can be stably detected. Also, reading out a signal from the plurality of photodetectors allows stably measuring an irradiation distribution of the light.

Having thus stated the structure of the present invention, it is to be understood that any other combination of such structure is duly included in the scope of the present invention. In addition, a categorical conversion of any expression in the present invention is also included in the scope of the present invention.

For example, the plurality of photodetectors in the photodetecting device may be aligned in a matrix array on a plane, while the photodetectors may be arranged as desired on a plane or in a space, without limitation to such an arrangement. For example, the photodetectors may be aligned in a matrix array on a curved face, or disposed linearly or radially on a plane.

According to the present invention, a structure that suppresses vibration of an optical area is provided, a photodetector and a photodetecting device capable of stably detecting a light can be obtained.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE INVENTION

The present invention will be now described herein with reference to illustrative embodiments. Those skilled in the art will recognize that many alternative embodiments can be accomplished using the teachings of the present invention and that the invention is not limited to the embodiments illustrated for explanatory purposed.

The present invention will be described in details hereunder, referring to the accompanying drawings. Throughout the drawings, similar constituents are given an identical numeral, and description thereof may be omitted where appropriate.

Figure 1:
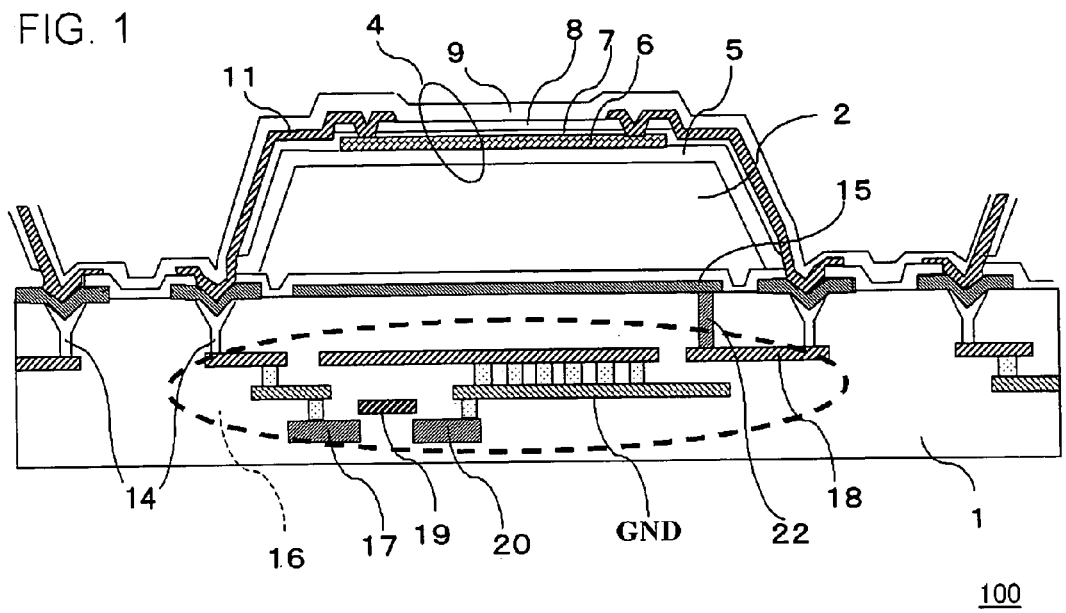
FIG. 1 is a schematic cross-sectional view showing a structure of an infrared detector according to an example 1 of the present invention.

Referring to FIG. 1, an infrared detector 100 includes a substrate (silicon substrate 1), a first conductor (infrared reflecting film 15) located close to an upper face of the substrate, an optical area (diaphragm 4) having a thermoelectric film (bolometer thin film 6), disposed above the substrate across a space (gap 2), and a second conductor (signal line 18) that electrically connects the thermoelectric film and the first conductor, such that the thermoelectric film and the first conductor have equipotential with each other.

Figure 2:
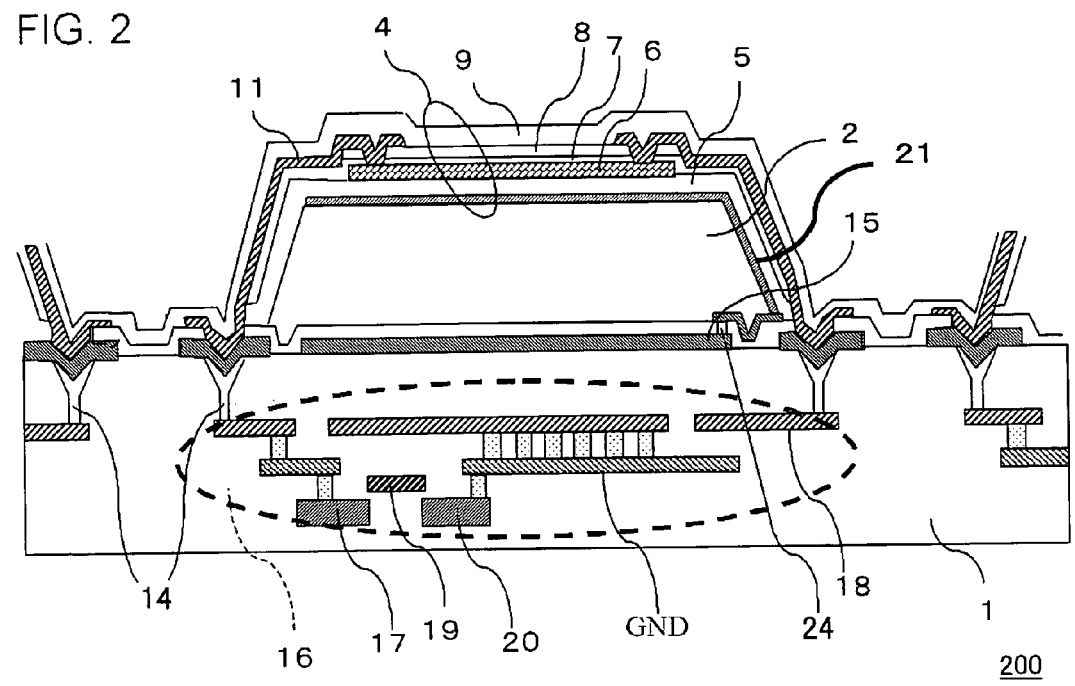
FIG. 2 is a schematic cross-sectional view showing a structure of an infrared detector according to an example 2.

Referring to FIG. 2, an infrared detector 200 includes a substrate (silicon substrate 1), a first conductor (infrared reflecting film 15) located close to an upper face of the substrate, an optical area (diaphragm 4) including a thermoelectric film (bolometer thin film 6), disposed above the substrate across a space (gap 2), a conductor under optical area (conductive film 21) located close to a lower face of the optical area, and a second conductor (signal line 18) that electrically connects the first conductor and the conductor under optical area, such that the first conductor and the conductor under optical area have equipotential with each other.

Figure 3:
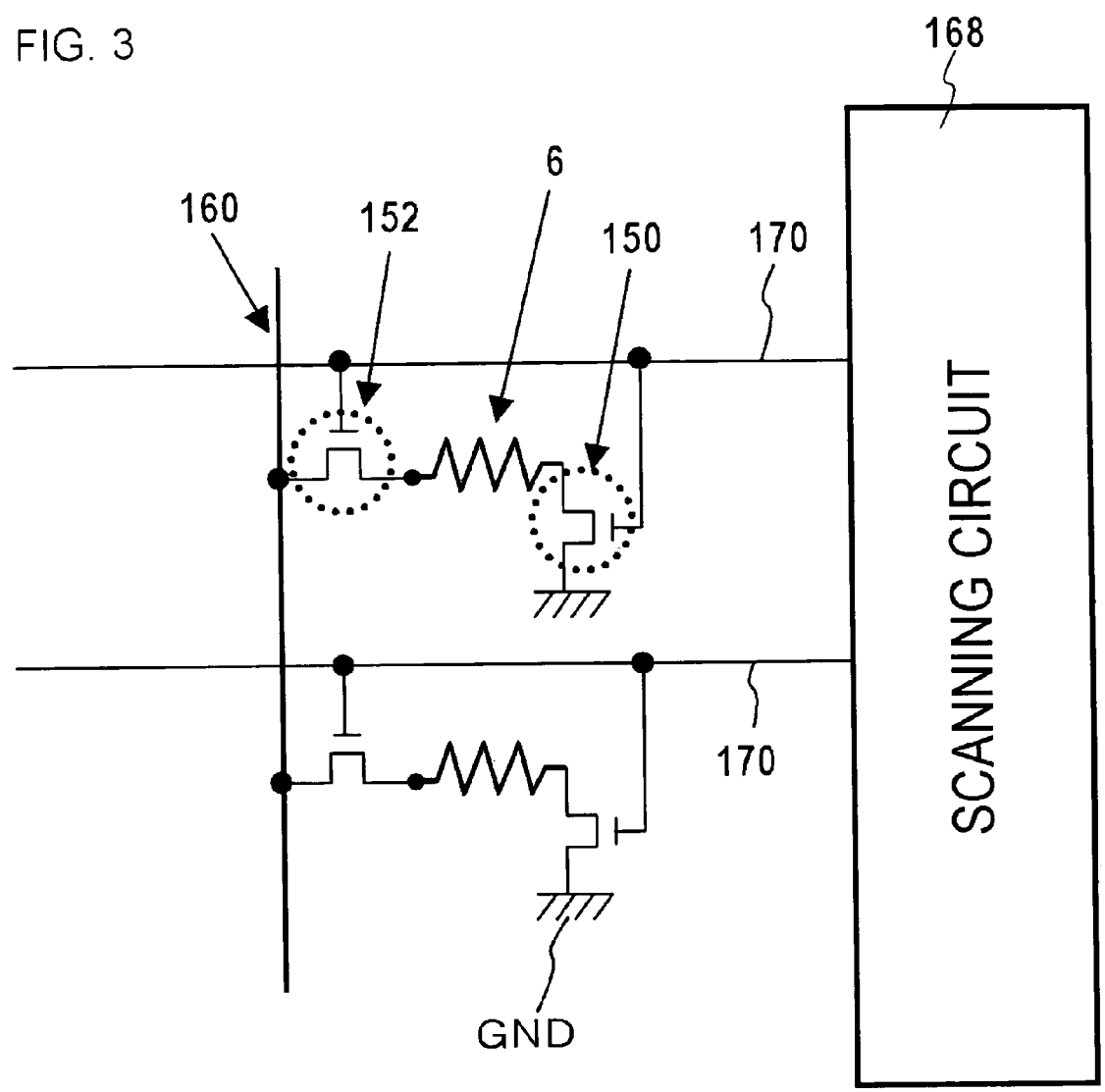
FIG. 3 is a circuit diagram showing an electrical configuration of an infrared detecting device according to an example 3.

Referring to FIG. 3, an infrared detecting device includes a plurality of photodetectors (infrared detectors 100 shown in FIG. 1 or infrared detectors 200 shown in FIG. 2), a scanning circuit 168 for the photodetectors, a readout circuit (not shown in the drawings) for the photodetectors, a plurality of scanning lines 170 connected to the scanning circuit 168, and a plurality of signal lines 160 connected to the readout circuit (not shown in the drawings).

FIG. 1 is a schematic cross-sectional view showing a structure of the infrared detector 100 according to an example 1 to be subsequently described.

The infrared detector 100 includes a silicon substrate 1, an infrared reflecting film 15 corresponding to the first conductor, located close to an upper face of the silicon substrate 1, a diaphragm 4 corresponding to the optical area, including a bolometer thin film 6 corresponding to thermoelectric film (thermo sensitive register film or the like), disposed above the silicon substrate 1 across a gap 2, and a signal line 18 corresponding to the second conductor that electrically connects the bolometer thin film 6 and the infrared reflecting film 15 without intermediation of a voltage applicating device, such that the bolometer thin film 6 and the infrared reflecting film 15 constantly have equipotential with each other.

The infrared detector 100 also includes a pixel transistor 16 disposed in the silicon substrate 1.

The pixel transistor 16 includes a gate 19, a source 20 and drain 17, and a ground interconnect GND, among which the source 20 and the drain 17 are connected to the ground interconnect GND.

The infrared reflecting film 15 and the bolometer thin film 6 constantly have the same potential, because of being electrically connected therebetween via the signal line 18 and the conductive plug 22.

In the infrared detector 100, the bolometer thin film 6 in the diaphragm 4 and the infrared reflecting film 15 close to an upper face of the silicon substrate 1 constantly remain equipotential. Such a structure restrains vibration due to an electrostatic attraction between the silicon substrate 1 and the diaphragm 4, thereby suppressing generation of a noise. Consequently, the infrared detector 100 that can stably detect an infrared light can be obtained.

FIG. 2 is a schematic cross-sectional view showing a structure of the infrared detector 200 according to an example 2 to be subsequently described.

The infrared detector 200 includes a silicon substrate 1, an infrared reflecting film 15, corresponding to the first conductor, located close to an upper face of the silicon substrate 1, a diaphragm 4 corresponding to the optical area, including a bolometer thin film 6 corresponding to thermoelectric film (thermo sensitive register film or the like), disposed above the silicon substrate 1 across a gap 2, a conductive film 21 corresponding to the conductor under optical area, located close to a lower face of the diaphragm 4, and a signal line 18 corresponding to the second conductor that electrically connects the conductive film 21 and the infrared reflecting film 15 without intermediation of a voltage applicating device, such that the conductive film 21 and the infrared reflecting film 15 constantly have equipotential with each other.

Also, the infrared detector 200 includes a pixel transistor 16 disposed in the silicon substrate 1.

The pixel transistor 16 includes a gate 19, a source 20 and drain 17, and a ground interconnect GND, among which the source 20 and the drain 17 are connected to the ground interconnect GND.

The infrared reflecting film 15 and the conductive film 21 constantly have the same potential, because of being electrically connected therebetween via the conductive plug 24.

In the infrared detector 200, the conductive film 21 close to a lower face of the diaphragm 4 and the infrared reflecting film 15 close to an upper face of the silicon substrate 1 constantly have equipotential. Such a structure restrains vibration due to an electrostatic attraction between the silicon substrate 1 and the diaphragm 4, thereby suppressing generation of a noise. Consequently, the infrared detector 200 that can stably detect an infrared light can be obtained.

In both of these infrared detectors, the infrared reflecting film 15 is employed as the first conductor. Under such a structure, an incident infrared light enters from above the diaphragm 4, and a portion of the incident infrared light is absorbed in the bolometer thin film 6, and then the remaining portion is reflected by the infrared reflecting film 15. When a height of the gap 2 is represented by d, such d may be designed to be $\lambda/(4n)$, where $\lambda$ is a wavelength of the incident infrared light, and n is approximately 1 in case of a gap. When a gap of such a height is provided, the reflected infrared light generates a standing wave in the gap, to be thereby absorbed into the bolometer thin film 6 in the optical area, owing to an electromagnetic effect. Therefore, a higher detective sensitivity can be granted to the infrared detector.

Also, in the both infrared detectors, a structure including a part of the signal line 18 or the like provided in the silicon substrate 1 serves as the second conductor according to the present invention.

According to such structure, the second conductor can be formed during a process of forming interconnects such as the signal line 18 or the like in the silicon substrate 1, and thus the manufacturing process of the infrared detector can be simplified.

Alternatively, the second conductor may be provided, isolated from the signal line 18 and so on in the silicon substrate 1. According to such a structure, since parasitic capacitance in the signal line 18 and so on can be reduced, a stability of detection sensitivity to the infrared detector can be granted.

Also, the height of the gap 2 may be fixed. In other words, the diaphragm 4 may be formed as a part of a beam-shaped structure fixed on the silicon substrate 1.

According to such structure, when applying a pulse bias to the bolometer thin film 6 for reading out a signal, a potential difference is generated between the silicon substrate 1 and the bolometer thin film 6, even if a fluctuation in electrostatic attraction is incurred, vibration of the diaphragm 4 is suppressed. Accordingly, a fluctuation in parasitic capacitance of the bolometer thin film 6 is restrained, which results in suppression of generation of a noise. Consequently, stable detection of an infrared light can be performed.

FIG. 3 is a circuit diagram showing an electrical configuration of the infrared detecting device 500 according to an example 3 to be subsequently described. The infrared detecting device 500 includes a readout circuit, though not shown in the drawings. While this embodiment refers to an infrared detecting device, the photodetecting device may be intended for detecting a UV light or a visible ray.

Since the infrared detecting device 500 includes the foregoing infrared detector (infrared detector 100 shown in FIG. 1 or infrared detector 200 shown in FIG. 2) and the readout circuit for the infrared detector, the infrared detecting device 500 can stably detect an infrared ray. Also, since the readout circuit serves to read out a signal from each of the infrared detectors, an irradiation distribution of infrared light, representing for example a temperature distribution of an object, can be stably measured.

The infrared detecting device 500 includes a plurality of infrared detectors (infrared detector 100 shown in FIG. 1 or infrared detector 200 shown in FIG. 2), a scanning circuit 168, an integration circuit (not shown in the drawings), a plurality of scanning lines 170 connected to the scanning circuit 168, a plurality of signal lines 160 connected to the integration circuit (not shown in the drawings), a plurality of pixel transistors 150 connected to each other between a terminal of the bolometer thin film 6 included in the infrared detector and the ground interconnect (GND) via the source 20 and the drain 17, and having the gate 19 connected to the scanning lines 170 respectively, and a plurality of pixel transistors 152 connected to each other between the other terminal of the bolometer thin film 6 included in the infrared detector and the signal lines via the source 20 and the drain 17, and having the gate 19 connected to the scanning lines 170 respectively.

According to such configuration, since it is able to apply a voltage only to the bolometer thin film 6 to be read out, fluctuation of an electrostatic attraction between the remaining bolometer thin film 6 and the silicon substrate 1 is suppressed. Accordingly, the number of the infrared detectors in which the diaphragm 4 vibrates is reduced, which results in reduction of a noise in a current flowing through the signal lines.

EXAMPLES

The present invention will be described in further details based on some examples hereunder, however the present invention is not limited thereto.

Example 1

FIG. 1 is a schematic cross-sectional view showing a structure of an infrared detector according to an example 1.

As shown in FIG. 1, an infrared reflecting film 15 and a signal line 18 are connected via a conductive plug 22 provided in a through hole. Such structure enables maintaining the infrared reflecting film 15 equipotential with a voltage applied to the bolometer thin film 6.

More specifically, when a voltage is applied to the bolometer thin film 6 via the signal line 18, the same voltage is simultaneously applied to the infrared reflecting film 15 located on an upper face of the silicon substrate 1. Since an electrostatic attraction between the bolometer thin film 6 and the silicon substrate 1 barely fluctuates at this moment, a generation of vibration of the diaphragm 4 is prevented.

When an electrostatic attraction between the bolometer thin film 6 and the silicon substrate 1 is generated, the diaphragm 4 becomes prone to vibrate. Here, by giving a same potential to the bolometer thin film 6 and the infrared reflecting film 15 located on an upper face of the silicon substrate 1, generation of an electrostatic attraction between the bolometer thin film 6 and the silicon substrate 1 is suppressed. This also suppresses charge fluctuation of the bolometer thin film 6, thereby reducing a displacement current, which causes a noise, in the signal line 18.

On the other hand, in a conventional infrared detector, periodically turning on and off a voltage applied to the bolometer through the signal line often provokes a potential difference between the substrate and the bolometer. This causes fluctuation of an electrostatic attraction between the substrate and the bolometer according to the Coulomb's law, thus causing the diaphragm to vibrate.

Now, when a fluctuation of the distance between the substrate and the bolometer is represented by $\Delta d$, a charge fluctuation $\Delta Q$ that can be formulated as $\Delta Q = \epsilon A V / \Delta d$ is generated in the bolometer ($\epsilon$: dielectric constant, A: area of the bolometer, V: potential difference between the substrate and the bolometer). The signal line is connected to a plurality of bolometers in parallel, and hence the voltage is applied to all the bolometers, not only to the bolometer being readout by the scanning circuit.

Since the charge fluctuation of the bolometer above described is added at the same time, a large displacement current flows through the signal line, which often generates a noise. In such a mechanism, when a potential difference between the substrate and the bolometer and a difference in strength among the beams or the like supporting the diaphragm are involved, a line pattern noise is prone to be generated.

On the contrary, the infrared detector 100 according to this example includes the silicon substrate 1, the diaphragm 4 which is an optical area supported by the silicon substrate 1. Between the silicon substrate 1 and the diaphragm 4, the gap 2 is provided. Further, the diaphragm 4 includes the bolometer thin film 6 constituted of a thermoelectric converting material, and electrodes provided on both sides.

Also, the infrared detector 100 includes the signal line 18 that a pulse voltage is applied to the bolometer thin film 6, and the infrared reflecting film 15 which is a conductive thin film electrically connected to the signal line 18, provided on the silicon substrate 1, so that the diaphragm 4 and an upper portion of the silicon substrate 1 constantly have equipotential.

In the infrared detector 100, since the bolometer thin film 6 and the infrared reflecting film 15 located on an upper face of the silicon substrate 1 are constantly equipotential, vibration of the diaphragm 4 due to an electrostatic attraction is suppressed. Accordingly, the vibration of the infrared detector is prevented, and generation of a linear pattern noise is suppressed.

In the infrared detector 100, an optical area is provided in the beam-shaped diaphragm 4, the diaphragm 4 is securely fixed on the silicon substrate 1. Accordingly, a small external force can suppress a fluctuation of the height d of the gap 2. Since the height d of the gap 2 does not readily fluctuate in the infrared detector 100, an optimum absorbing wavelength is also prevented from fluctuating. Consequently, an infrared ray of a specific wavelength can be stably detected.

Further in the infrared detector 100, since a voltage applicating device or the like is not provided between the bolometer thin film 6 and the infrared reflecting film 15 located on an upper face of the silicon substrate 1, fluctuation of a voltage to be applied is prevented. This also prevents a fluctuation in height d of the gap 2, thus suppressing generation of a noise and fluctuation of an optimum absorbing wavelength. Consequently, stability of detection of an infrared light of a specific wavelength can be further increased.

Example 2

FIG. 2 is a schematic cross-sectional view showing a structure of an infrared detector 200 according to an example 2.

The infrared detector 200 according to the example 2 has a similar basic structure as that of the infrared detector 100 of the example 1. Therefore, the infrared detector 200 also provides the advantage of suppressing the vibration of the diaphragm 4 as well as the infrared detector 100.

As shown in FIG. 2, a difference in the infrared detector 200 from the infrared detector 100 is that the conductive film 21 electrically connected to the infrared reflecting film 15 is formed under the diaphragm 4, and that hence a region under the diaphragm 4 is constantly equipotential with the infrared reflecting film 15. Another difference from the infrared detector 100 is that the infrared reflecting film 15 and the bolometer thin film 6 are not electrically connected. The infrared detector 200 includes the silicon substrate 1, and the diaphragm 4 which is an optical area supported by the silicon substrate 1. Between the silicon substrate 1 and the diaphragm 4, the gap 2 is provided. Further, the diaphragm 4 includes the bolometer thin film 6 constituted of a thermoelectric converting material, and electrodes provided on both sides.

Also, the infrared detector 200 includes the infrared reflecting film 15 formed on the silicon substrate 1, and the conductive thin film 21 formed under the diaphragm 4 and electrically connected to the infrared reflecting film 15, so that the region under the diaphragm 4 and the silicon substrate 1 constantly have equipotential. The conductive thin film 21 is not electrically connected to the signal line 18, but is provided, which is isolated from the signal line 18.

Under such a structure of the infrared detector 200, when a pulse voltage is applied to the bolometer thin film 6 through the signal line 18, the conductive film 21 connected to the infrared reflecting film 15 serves as a shield between the bolometer thin film 6 and the silicon substrate 1. This suppresses generation of an electrostatic attraction between the bolometer thin film 6 and the silicon substrate 1, thus preventing generation of vibration of the diaphragm 4. Consequently, generation of a charge fluctuation of the bolometer thin film 6 is prevented, and the displacement current that causes generation of a noise in the signal line is reduced.

Also, the conductive thin film 21 is not electrically connected to the signal line 18, but is provided, which is isolated from the signal line 18. Accordingly, the parasitic capacitance in the signal line 18 is reduced, and thus the noise in the signal read out from the signal line is reduced.

Example 3

FIG. 3 is a schematic circuit diagram showing a configuration of an infrared detecting device 500 according to an example 3. The infrared detecting device includes a readout circuit, though not shown in the drawings. While in this example, an infrared detecting device is referred as an example, the photodetecting device may be intended for detecting a UV ray (ultraviolet ray) or a visible ray.

As shown in FIG. 3, the infrared detecting device 500 according to the this example includes a plurality of infrared detectors according to the examples (infrared detector 100 shown in FIG. 1 or infrared detector 200 shown in FIG. 2), a scanning circuit 168, an integration circuit (not shown in the drawings), a plurality of scanning lines 170 connected to the scanning circuit 168, and a plurality of signal lines 160 connected to the integration circuit (not shown in the drawings). The infrared detectors are aligned in a matrix array on a silicon substrate (not shown in the drawings).

The infrared detecting device 500 includes a readout circuit, which is similarly constituted to a readout circuit 300 shown in FIG. 5 according to a comparative example to be subsequently described. Referring again to FIG. 3, the infrared detecting device 500 includes a plurality of pixel transistors 150. Each of the pixel transistors 150 is connected to a scanning line 170 on a gate electrode respectively, to each ground interconnect GND on a source electrode, and to a terminal of each bolometer thin film 6 (serving as a resistance device) of the infrared detector on a drain electrode.

The bolometer thin films 6 are aligned in an array, thus constituting a bolometer array 172.

Figure 5:
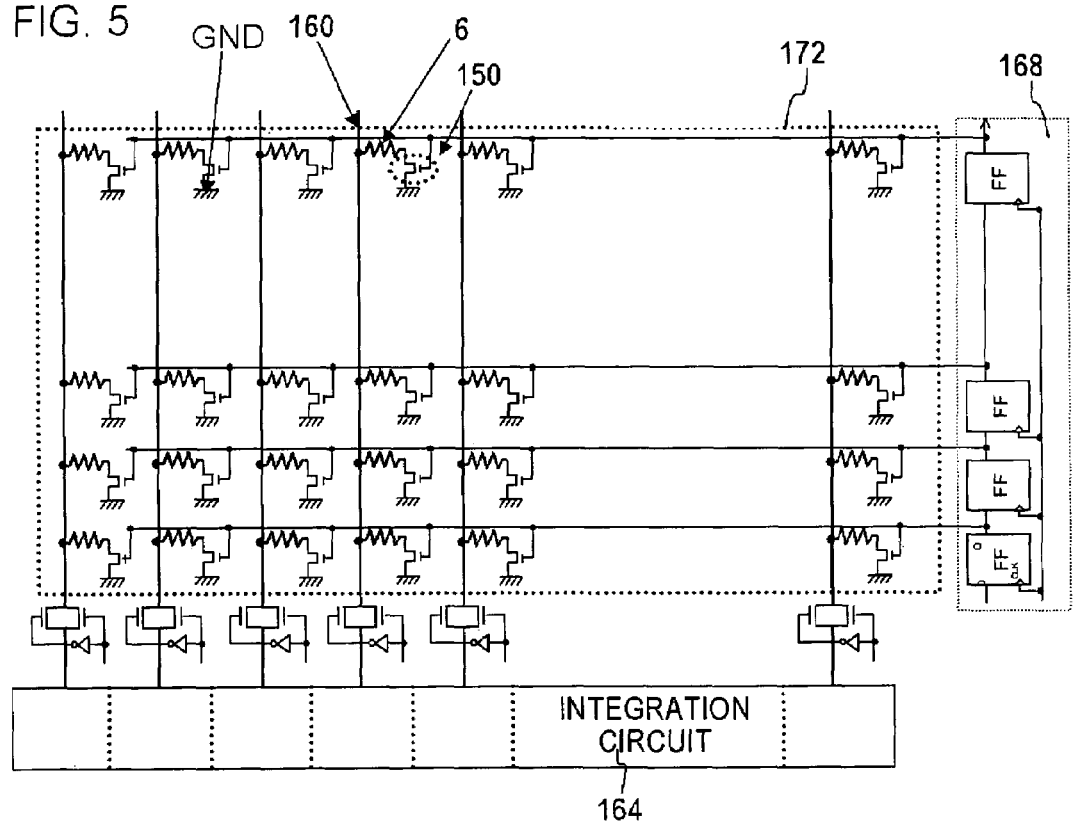
FIG. 5 is a circuit diagram equivalent to a readout circuit according to the comparative example.
Figure 6A:
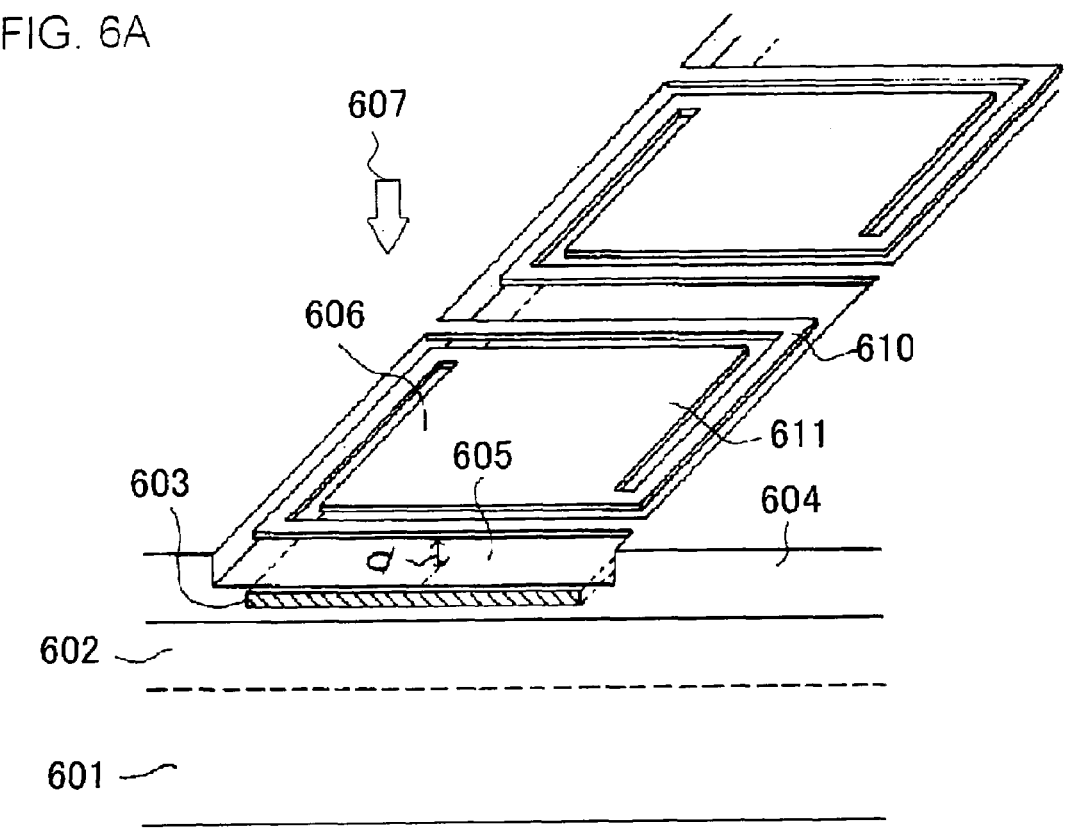
FIG. 6A is a perspective view.
Figure 6B:
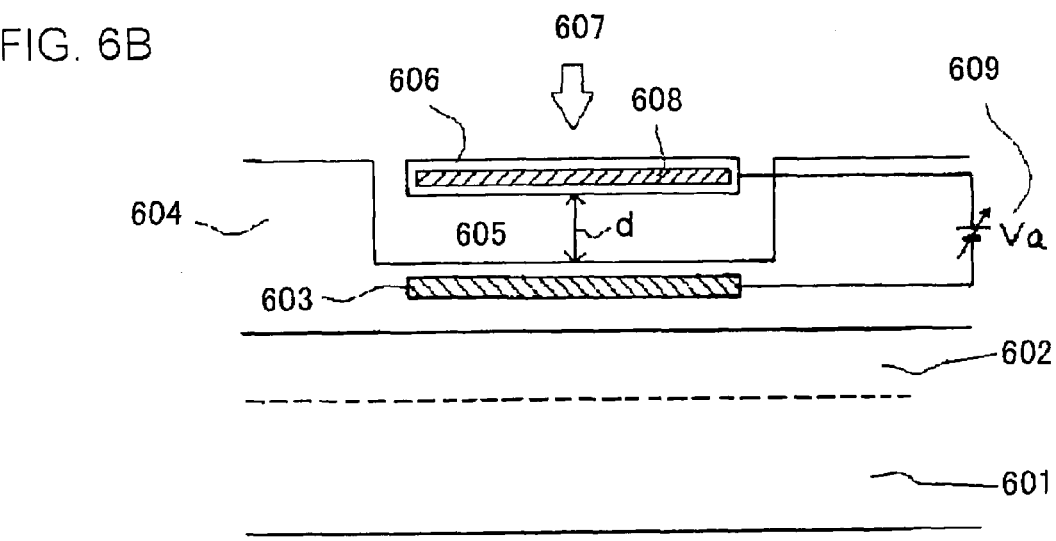
FIG. 6B is a cross-sectional view showing a structure of a conventional infrared detector.

The infrared detecting device 500 has a unique structure different from a structure of a comparative example including a readout circuit shown in FIG. 5, in including a plurality of pixel transistors 152, each of which is connected to a scanning line 170 on the gate electrode respectively, to the other terminal of each bolometer thin film 6 provided in the infrared detector on the source electrode respectively, and to each signal line 160 on the drain electrode respectively.

Also, the infrared detecting device 500 includes a silicon substrate, and an optical area supported by the silicon substrate, and a gap is provided between the silicon substrate and the optical area. The optical area includes a thin film constituted of a thermoelectric converting material and electrodes, so that a signal is provided only to the thermoelectric converting material selected by the scanning circuit.

Also, since the infrared detecting device 500 includes a unique structure having the pixel transistors 152, a voltage can be selectively applied only to the bolometer thin film in the infrared detector to be read out. Accordingly, fluctuation of the electrostatic attraction between the bolometer thin film and the silicon substrate in the remaining infrared detectors is barely generated. Consequently, the number of infrared detectors having the bolometer thin film that charge fluctuates is limited, and hence the displacement current in the signal line, which causes a noise, is reduced. It is to be noted that such an advantageous effect can equally be obtained, even the infrared detecting device doesn't have the pixel transistor 150.

Also, since the infrared detecting device 500 includes the plurality of the infrared detectors aligned in a matrix array, an irradiation distribution of infrared ray of a specific wavelength due to a temperature distribution of an object or the like, can be stably measured by reading out a signal from each of the infrared detectors respectively.

Comparative Example

Figure 4:
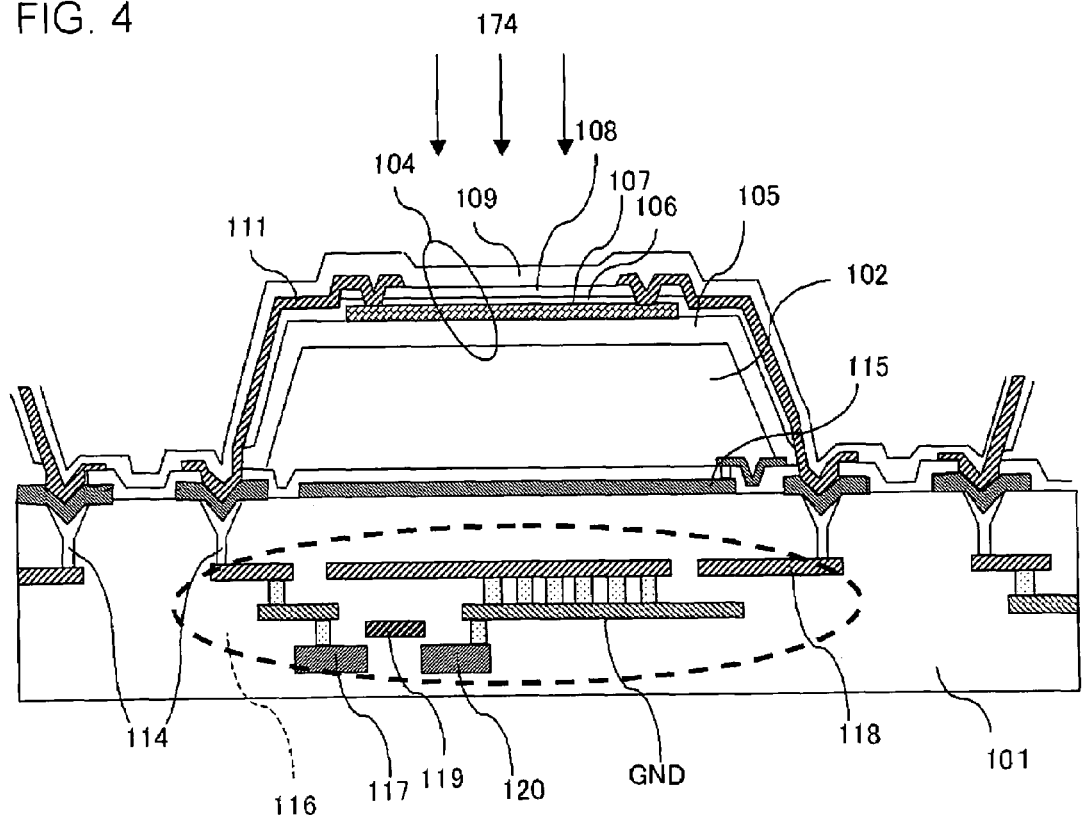
FIG. 4 is a schematic cross-sectional view showing a structure of an infrared detector according to a comparative example.

FIG. 4 is a schematic cross-sectional view of a pixel included in an infrared detector 400 according to a comparative example.

The infrared detector 400 includes a diaphragm 104, which is an optical area included in a beam structure supported above a silicon substrate 101 by a pair of supporting members (not shown in the drawings), and a pixel transistor 116 provided in the silicon substrate 101. The diaphragm 104 includes a bolometer thin film 106, electrodes and a protective film 105, a protective film 107, a protective film 108, and a protective film 109 that surround electrodes. The supporting members (not shown in the drawings) include an interconnect material thin film 111 for connecting and the protective film 105 and the protective film 109 that surround the interconnect material thin film 111.

Also, in the structure of the infrared detector 400, the diaphragm 104 is supported by a pair of supporting members above the silicon substrate 101 including the pixel transistor 116, across a gap 102. The electrodes on the respective sides of the bolometer thin film 106 provided in the diaphragm 104 are electrically connected to a drain 117 of the pixel transistor 116 and a signal line 118, via the interconnect material thin film 111, a contact pad 113, and an interconnect plug 114 that is made of tungsten.

Also, a gate 119 of the pixel transistor 116 is connected to a scanning circuit, and a source 120 is connected to a ground interconnect GND constituting a majority of the cells of the pixel transistor 116. On an upper face of the silicon substrate 101, an infrared reflecting film 115 is disposed. The infrared reflecting film 115 is electrically floating, and occupies a majority of the pixel of 37 μm square with a distance of approximately 1.5 μm from the protective film 105.

A portion of infrared ray 174 entered in the optical area of the pixel is absorbed in the diaphragm 104. The remaining infrared ray 174 which has passed through the diaphragm 104 is reflected by the infrared reflecting film 115 toward the diaphragm 104, thus to be absorbed in the diaphragm 104 again. The absorbed infrared ray 174 raises a temperature of the diaphragm 104 of each pixel, and the infrared ray is converted to an electrical signal in the bolometer thin film 106.

Under the structure of the infrared detector 400 according to this comparative example, when a pulse bias is applied to the bolometer thin film 106 for reading out a signal, a potential difference is prone to be generated between the silicon substrate 101 and the bolometer thin film 106, which often provokes a fluctuation of electrostatic attraction therebetween thus causing the diaphragm 104 to vibrate, unlike the infrared detectors according to the examples. This also causes a change in parasitic capacitance of the bolometer thin film 106, resulting in generation of a noise.

FIG. 5 is a circuit diagram equivalent to a readout circuit 300 of the infrared detector according to the comparative example. The pixels including this infrared detector are two-dimensionally arranged on the silicon substrate.

The signal line 160 provided under the pixel is connected to pixel arrays disposed in parallel along the signal line. Further, one or a plurality of the signal lines is connected to an integration circuit 164. By disposing the plurality of signal lines 160 and of integration circuits 164, the two-dimensional readout circuit is provided.

A readout operation is performed as follows. Among the pixels that a voltage is applied in parallel through the signal line 160, a pixel selected via the scanning line 170 (FIG. 3) by the scanning circuit 168 controlling the pixel transistor 150 is converted into an electrical signal, and such a signal is read out by the integration circuit 164.

In the case of the readout circuit 300 in the infrared detector 400 according to the comparative example, it is difficult to apply a voltage only to a particular bolometer thin film 6 to be read out, unlike the infrared detector according to the examples. Therefore, a fluctuation of electrostatic attraction between a bolometer thin film 6 and the silicon substrate 1 that is not target to readout may be generated. This leads to an increase in the number of bolometer thin film 6 that fluctuate the charge, and hence an increase in the displacement current, which generates a noise, in the signal line 160.

Although the present invention has been described based on the embodiments and the examples and referring to the drawings, it is to be understood that they are only exemplary and that various other configurations may be employed.

For example, while the gap 2 is provided between the bolometer thin film 6 and the silicon substrate 1 in the examples, an insulating material such as a silicon oxide film or the like may be filled between the bolometer thin film 6 and the silicon substrate 1. In this case, the optical area including the bolometer thin film is sustained by the silicon oxide layer, and thus becomes less prone to vibrate. Therefore, an infrared ray of a specific wavelength can be detected more stably.

Also, while in the embodiments and examples, an infrared detector that detects a ray in an infrared wavelength range is referred as an example, the photodetector according to the present invention is not limited thereto. For example, the photodetector may be designed for detecting a ray in a visible wavelength range or in a UV wavelength range.

Further, while a MOS transistor is employed as the pixel transistor in the embodiments and examples, the pixel transistor according to the present invention is not limited thereto. For, example, other types of transistors, such as a bipolar transistor, may be suitably employed.

It is apparent that the present invention is not limited to the above embodiment, that may be modified and changed without departing from the scope and spirit of the invention.

What is claimed is:

1. A photodetector comprising:
   a substrate;
   a first conductor located close to an upper face of said substrate;
   an optical area including a thermoelectric film, disposed above said substrate across a space; and
   a second conductor that electrically connects said thermoelectric film and said first conductor, such that said thermoelectric film and said first conductor have equipotential with each other,
   wherein said first conductor and said thermoelectric film face each other across said space.

2. The photodetector according to claim 1, wherein said second conductor includes a part of an interconnect provided in said substrate.

3. The photodetector according to claim 1, wherein a height of said space is fixed.

4. The photodetector according to claim 1, wherein said optical area is provided as a part of a beam-shaped structure fixed on said substrate.

5. The photodetector according to claim 1, wherein said photodetector is an infrared detector.

6. A photodetecting device comprising:
   a plurality of photodetectors according to claim 1;
   a scanning circuit for said photodetectors;
   a readout circuit for said photodetectors;
   a plurality of scanning lines connected to said scanning circuit; and
   a plurality of signal lines connected to said readout circuit.

7. The photodetecting device according to claim 6, further comprising:
   a plurality of transistors connected to a terminal of said thermoelectric film provided between said photodetectors and said signal lines, and having a control electrode connected to said scanning line respectively.

8. The photodetecting device according to claim 6, further comprising:
   a plurality of first transistors connected to a terminal of said thermoelectric film provided between said photodetectors and said ground, and having a control electrode connected to said scanning lines respectively; and
   a plurality of second transistors connected to the other terminal of said thermoelectric film provided between said photodetectors and said signal lines, and having a control electrode connected to said scanning lines respectively.

9. A photodetector comprising:
   a substrate;
   a first conductor located close to an upper face of said substrate;
   an optical area including a thermoelectric film, disposed above said substrate across a space;
   a conductor under optical area located close to a lower face of said optical area; and
   a second conductor that electrically connects said conductor under optical area and said first conductor, such that said conductor under optical area and said first conductor have equipotential with each other;
   wherein said first conductor and said conductor under optical area face each other across said space.

10. The photodetector according to claim 9, wherein said second conductor includes a part of an interconnect provided in said substrate.

11. The photodetector according to claim 9, wherein a height of said space is fixed.

12. The photodetector according to claim 9, wherein said optical area is provided as a part of a beam-shaped structure fixed on said substrate.

13. The photodetector according to claim 9, wherein said photodetector is an infrared detector.

14. A photodetecting device comprising:
   a plurality of photodetectors according to claim 9;
   a scanning circuit for said photodetectors;
   a readout circuit for said photodetectors;
   a plurality of scanning lines connected to said scanning circuit; and
   a plurality of signal lines connected to said readout circuit.

15. The photodetecting device according to claim 14, further comprising:
   a plurality of transistors connected to a terminal of said thermoelectric film provided between said photodetectors and said signal lines, and having a control electrode connected to said scanning line respectively.

16. The photodetecting device according to claim 14, further comprising:
   a plurality of first transistors connected to a terminal of said thermoelectric film provided between said photodetectors and said ground, and having a control electrode connected to said scanning lines respectively; and
   a plurality of second transistors connected to the other terminal of said thermoelectric film provided between said photodetectors and said signal lines, and having a control electrode connected to said scanning lines respectively.

17. A photodetector comprising:
   a substrate;
   a first conductor located close to an upper face of said substrate;
   an optical area including a thermoelectric film, disposed above said substrate across a space; and a second conductor that electrically connects said thermoelectric film and said first conductor, such that said thermoelectric film and said first conductor have equipotential with each other;

wherein said second conductor is provided, which is isolated from an interconnect provided in said substrate.

18. A photodetector comprising:

a substrate;

a first conductor located close to an upper face of said substrate;

an optical area including a thermoelectric film, disposed above said substrate across a space;

a conductor under optical area located close to a lower face of said optical area; and a second conductor that electrically connects said conductor under optical area and said first conductor, such that said conductor under optical area and said first conductor have equipotential with each other;

wherein said second conductor is provided, which is isolated from an interconnect provided in said substrate.

19. The photodetector according to claim 1, wherein said first conductor is a light reflecting film.

20. The photodetector according to claim 9, wherein said first conductor is a light reflecting film.

* * * * *